United States Patent [19]
Edmondson

[11] Patent Number: 5,902,483
[45] Date of Patent: May 11, 1999

[54] ENERGY CONSERVING OIL AND WATER PROCESSING VESSEL

[76] Inventor: Jerry M. Edmondson, 510 Canal St., Newport Beach, Calif. 92663

[21] Appl. No.: 08/858,604

[22] Filed: May 19, 1997

[51] Int. Cl.[6] .................................................... C02F 1/40
[52] U.S. Cl. ........................ 210/521; 210/537; 210/539; 210/540; 210/DIG. 5
[58] Field of Search .............................. 210/86, 104, 521, 210/537, 538, 539, 540, DIG. 5

[56] References Cited

U.S. PATENT DOCUMENTS

| | | | |
|---|---|---|---|
| 1,647,344 | 11/1927 | Cushman | 210/540 |
| 2,746,607 | 11/1956 | Hess | 210/DIG. 5 |
| 2,782,929 | 2/1957 | Colket | 210/540 |
| 4,059,517 | 11/1977 | Strahorn et al. | 210/539 |
| 4,257,895 | 3/1981 | Murdock | 210/DIG. 5 |
| 4,359,329 | 11/1982 | Willeitzer | 210/DIG. 5 |
| 4,919,777 | 4/1990 | Bill | 210/DIG. 5 |
| 5,132,011 | 7/1992 | Ferris | 210/521 |
| 5,246,592 | 9/1993 | Schweizer et al. | 210/DIG. 5 |
| 5,415,776 | 5/1995 | Homan | 210/521 |
| 5,484,534 | 1/1996 | Edmondson | 210/804 |

*Primary Examiner*—Christopher Upton

[57] ABSTRACT

An oil processing vessel for cleaning oil and the associated produced water utilizing the principle of capillary attraction in lieu of heat and/or electric coalescence to dehydrate the oil and in lieu of induced gas flotation to extract oil from the water. The oil processing vessel also includes a means for mitigating the foam often encountered when processing crude oil and if required an integral means to split the oil discharge from the vessel into disparate proportional flow streams. There also can be included a means for extracting extraneous material that accumulates inside the vessel at the water/oil interface.

8 Claims, 1 Drawing Sheet

ENERGY CONSERVING OIL AND WATER PROCESSING VESSEL

FIELD OF THE INVENTION

This invention relates to apparatus and processes useful for dehydrating oil continuous emulsions such as crude petroleum oils and further is useful for removing dispersed oil particles from the associated water continuous brine produced with the crude oil, more particularly this invention relates to improved apparatus and processes employing the principle of capillary attraction to extract dispersed water from oil and dispersed oil from water in a single vessel and if required can include an integral means for splitting the crude oil discharge from the vessel into disparate proportional flow streams and a further means for removing extraneous material that accumulates at the water/oil interface.

BACKGROUND OF THE INVENTION

It is conventional to dehydrate the oil utilizing heat and electrostatic coalescence to speed up the gravitational separation of the water from the oil in a vessel as exemplified by the Bull U.S. Pat. No. 4,919,777, and then deliver the separated water to another vessel such as that exemplified by my U.S. Pat. No. 5,484,534 for removal of the oil from the water using flotation or a similar means to speed up gravitational separation of the oil from the water. The conventional processes for removing water from the oil and the conventional processes for removing oil from the water as exemplified by the referenced patents consume considerable energy and are expensive. Further, as described by the Bull patent Column 3 lines 5 through 15, when the amount of water produced with the oil is a high percentage then a third vessel known as a Free Water Knockout is used in front of the oil dehydrator.

The principal object of the present invention is to provide an apparatus and process for combining all three of the functions, Free Water Knockout, Oil Dehydrator and Water Treater into a single vessel constructed in such a manner as to employ the principle of capillary attraction thereby providing a very energy efficient means for removing water from oil and oil from water at less capital expense and less operating expense and including an integral means for splitting the crude oil discharge from the vessel into disparate proportional flow streams, and a means of extracting extraneous material that accumulates at the water/oil interface from the vessel.

SUMMARY OF THE INVENTION

The above and other objects of the present invention are achieved by providing apparatus that, receiving an oil and water mixture, will separate free water, dehydrate the oil and remove oil from the water in a single vessel of unique configuration and construction wherein there is means for implementing several stages of processes and means for applying the principle of capillary attraction as an energy efficient way to speed up gravitational separation.

The vessel is of a horizontal cylindrical shape closed on both ends and arranged for a longitudinal flow therethrough, on one end there is an inlet conduit through which the oil and water mixture can enter and on the opposite end are at least two conduits through which the dehydrated oil can exit and through which the clean water can exit. On the top of the vessel near the outlet end is a conduit through which vapor can exit the vessel. Located approximately midway of the vessel length are two transverse partial bulkheads that divide the vessel into two compartments. The first compartment is utilized for separating free water from the oil/water mixture and the second compartment is used to extract the emulsified water from the oil and extract dispersed oil particles from the water. The partial bulkheads direct the oil to an upper portion of the vessel and the water to a lower portion of the vessel. In the first compartment of the vessel near the inlet conduit in the uppermost portion of the vessel is a transverse solid baffle segment with an upper curved edge sealed to the top inside of the vessel and with a lower horizontal edge of the baffle serrated and protruding into the oil to a depth where the serrations will penetrate the upper surface of the oil so that any vapor evolving upstream of the baffle will be entrapped requiring the vapor to depress the liquid surface upstream of the baffle to a level where the vapor can exit through the serration, bubbling through a layer of the oil. This action regarding the vapor will cause the collapse of bubbles that form as the vapor initially evolves from the oil. If left on the surface of the oil, the vaporous bubbles saturated with water will skim the surface of the oil carrying water to the oil outlet conduit and oily foam to the vapor outlet conduit.

Both the forward and rearward compartments of the vessel contain permeable baffles transverse to the flow, constructed in such a manner as to effect the capillary attraction phenomenon. The baffles cover the full cross section of the vessel exposing both the oil flow and the water flow to the permeable baffles. The baffles are constructed from wire cloth with the wire diameter and the mesh size selected to suit the particular fluid being processed. Generally speaking the wire diameter and opening size will increase proportional to the increase of the viscosity of the oil, the size will be larger for more viscous oil. Located at the top of each permeable baffle, intersecting the vapor/liquid interface, is a solid strip of material transverse to the flow of the fluid. This impermeable strip prevents the liquid from skimming across the upper surface of the oil. Each permeable baffle is constructed using at least two layers of wire cloth with a ¼" to ½" space between each layer. As the fluid flows through the permeable baffles the part of the baffle exposed to the oil continuous phase will extract dispersed water particles and the part of the baffle exposed to the water continuous phase will extract dispersed oil particles. The discontinuous phase liquid will adhere to the wire until enough has accumulated that it falls off the wire under its own bulk. These conglomerated masses of discontinuous phase fluids will then rapidly separate from the continuous phase liquid within which it is contained rising or falling to join its like continuous phase fluid; that is, the aglomerated oil will rise through the water continuous phase to join the oil layer and the aglomerated water will drop through the oil continuous phase to join the water layer. This action of the oil rising and the water dropping creates a concentrated intersection at the oil/water interface wherein a layer of the mixture will grow, encroaching on the space used for separation. To mitigate this encroachment on the separation space a conduit can be located on the vessel at the interface extending into the interior of each compartment of the vessel whereby some of the concentrated oil/water mixture can be withdrawn periodically.

In some instances the present invention can be utilized as an intermediate processor whereby more than one additional processing vessel will be used downstream for further processing of the oil. When the oil is being delivered to two or more vessels the present invention can include a unique flow splitting means located internally near the outlet end of the second compartment that will discharge the oil from the vessel in pre-selected proportions. The flow splitting means consists of a cylindrical elongated vertical conduit with a top inlet opening and a bottom outlet opening connected to an oil outlet conduit. The top inlet is notched whereby the bottom edge of the notch acts as the spill over for the oil, with said bottom edge being at an elevation slightly above the bottom serrated edge of the before mentioned solid baffle segment, said baffle being located in the first compartment, and establishes the upper level of the oil down stream from said baffle segment. Inside the vertical conduit adjacent to said notch is a rotatable sliding door that can be used to establish the width of the notch opening. The rotable sliding door is attached to a vertical shaft centrally located within the vertical conduit and protruding through an opening in the vessel upper wall in such a manner as to permit the rotatable sliding door to be rotated from the exterior of the vessel. The said opening will have a sealing means around the vertical shaft to contain pressure inside the vessel. If it is not desirous to deliver oil to two or more external receiving vessels then the oil level is established by a single vertical conduit located in the second compartment near the outlet end of the vessel and connected to an oil outlet conduit, said vertical conduit constructed in such a way that its upper edge will serve as a spill over for the oil establishing the upper surface of the oil inside the vessel. The water oil interface shall be controlled by a sensor that detects a rising water level and will cause a valve located on the water outlet conduit to open to discharge water when the water level rises.

DESCRIPTION OF THE PREFERRED EMBODIMENT

Figure 1:
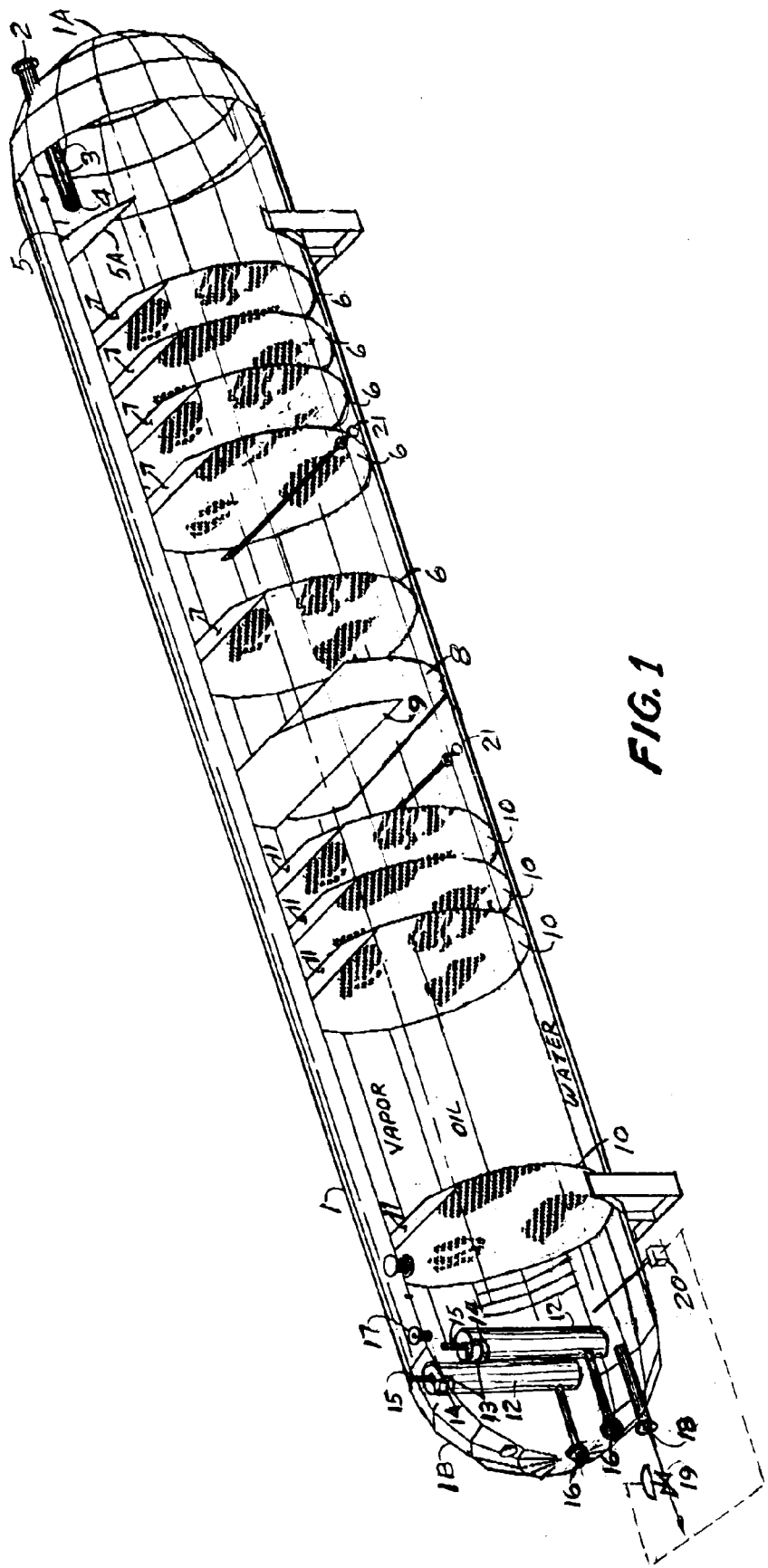
FIG. 1 is a perspective view of the preferred embodiment of the invention illustrating all of the essential elements and components.

Referring to FIG. 1. There is disclosed an oil and water processing vessel wherein water will be extracted from oil and oil will be extracted from water primarily through the application of capillary attraction and further wherein when desirable the oil discharge from the vessel can be split into two or more disparate flow streams of predetermined proportions and wherein to enhance the performance there is means to mitigate foaming of the oil upon vapor evolvement and further means for mitigating the encroachment upon the separating space of extraneous material at the water/oil interface.

The oil and water processing vessel consists of a horizontal cylindrical container 1 with two end closures 1a and 1b. The oil and water enters the container through an inlet conduit 2, the conduit protrudes through end closure 1a into the interior of the container, there is a closure 4 on the end of the protrusion and openings 3 on opposite sides of the protrusion, this arrangement causes the oil and water to flow across the width of the container upon entering through the openings. Once inside the container oil will migrate to an upper area and the water will migrate to a lower area. Downstream of the protrusion closure is a transverse solid baffle segment 5 the upper edge of which is curved to fit the uppermost portion of the container and is sealed to the upper inside wall of the container. The lower edge 5a of the baffle is horizontal and contains serration's that penetrate the surface of the oil. Upon entering the container and given the opportunity to slow down the oil and water will initially release some vapor. The evolving vapor will invariably cause foaming at the surface of the oil. The baffle 5 entraps most of the foam upstream of the baffle and upon passing through the serrations and contacting a layer of oil the foam bubbles will collapse. As the oil and water move longitudinally through the vessel they will come into contact with a series of permeable full diameter baffles 6. These baffles are constructed from wire cloth with each baffle having at least 2 layers of wire cloth spaced ¼" to ½" apart. Upon contacting the wire cloth the discontinuous phase liquid will be attracted to the wire through capillary attraction. Each baffle has an impermeable strip 7 intersecting the vapor/oil interface to prevent surface skimming. Midway of the container length are two partial bulkheads 8 and 9, bulkhead 8 having an upper edge slightly below the vapor/oil interface and a lower edge lower than the water/oil interface and bulkhead 9 with an upper edge above the vapor/oil interface and a lower edge above the water/oil interface. These partial bulkheads direct the oil to the upper region of the container and the water to the lower region. Further the partial bulkheads will cause the oil flow to spread across the full width of the container and they have the affect of dividing the container into two compartments the first compartment serves to separate the bulk of the water from the oil and the second compartment is used for extracting the more entrained discontinuous phase liquids from the continuous phase liquids.

Upon exiting the first compartment as directed by partial bulkheads 8 and 9 the oil and water will contact a second series of permeable baffles 10 of similar construction to baffles 6 including the impermeable strips 11 located on each baffle at the oil/vapor interface. Remaining discontinuous phase liquids will be extracted from the continuous phase liquids by this further exposure to the effects of capillary attraction. The oil level of the vessel is established by the upper edge of the vertical conduit 12 into which the oil will spill. If it is desired to split the flow into more than one outlet stream then the container will have more than one vertical conduit and further the proportion of each oil outlet stream can be controlled by including a notch 13 at the upper edge of the vertical conduit and placing a rotatable door 14 behind and adjacent to the notch with a sealed shaft 15 protruding through the upper surface of the container to permit the door to be rotated externally by turning the shaft. The oil that spills into the conduit 12 will be discharged through the oil outlet conduit(s) 16. The vapor will exit the container through the vapor outlet conduit 17. the water will exit the vessel through the water outlet conduit 18 with the discharge rate of the water being controlled by valve 19 which will open when the water level sensor 20 detects a rise in the water level and sends a signal to the valve. The container can include interface evacuation conduits 21 located at the water/oil interface and protruding into the interior of the container said conduits can be used to withdraw extraneous material that accumulates at the oil/water interface.

From the foregoing it can be seen that this invention is one well adapted to attain all the ends and objects herein set forth, together with other advantages which are obvious and inherent.

It is understood that certain features and subcombinations are of utility and may be employed without reference to other features and subcombinations. This is contemplated by and within the scope of the claims. Although the foregoing invention has been described in detail, by way of illustration and example, for purposes of clarity of understanding it will be obvious that certain changes and modifications may be practiced within the scope of the appended claims.

What is claimed is:

1. An oil/water separator vessel of horizontal cylindrical shape closed on both ends providing means for horizontal flow and gravity to separate water, oil and gas that is entrained in the oil into disparate layers of gas, oil and water, having an inlet at one end and at least one oil outlet, a gas outlet and a water outlet at the opposite end; and having a baffle separating the vessel into a first compartment and a second compartment, each compartment having at least one permeable baffle transverse to the flow covering the full cross sectional area of said vessel, wherein a non-permeable strip is located at a gas/oil interface area of each said permeable baffles.

2. An oil/water separator vessel as described by claim 1, wherein said permeable baffle comprise two or more layers of wire cloth with ¼ to ½ inch of space between each layer of wire cloth.

3. An oil/water separator vessel as described by claim 1 wherein said baffle separating the vessel into said first and second compartments comprises two partial bulkheads in proximity to each other, the first partial bulkhead including a horizontal bottom edge below an oil/water interface and an upper horizontal edge below the gas/oil interface, the second partial bulkhead including a horizontal upper edge above the gas/oil interface and a lower horizontal bottom edge above the oil/water interface.

4. A oil water separator vessel as described by claim 1 and further including means for maintaining the level of the upper surface of the oil in said second compartment, comprising at least two vertical, elongated cylindrical conduits with an open top end and a bottom end connected to said oil outlet.

5. An oil/water separator vessel as described by claim 4 and further including a means for regulating the rate of oil flow into said vertical conduits.

6. An oil water separator vessel as described by claim 5 wherein said means to regulate the oil flow into said vertical conduit comprises a notch at the upper end of said conduit, the bottom edge of which forms means to establish the upper surface of the oil, a rotatable door, of a shape to fit the interior surface of said conduit, adjacent said notch, said door being attached to a round shaft located in the center of said conduit, said shaft protruding through an opening in an upper wall of said oil/water separator vessel, and further including a means for sealing the surface around said shaft to prevent leakage, through the opening, of the contents of said vessel.

7. An oil/water separator vessel as described by claim 1 and further including a means adjacent said inlet for entrapping said gas, said means comprised of a barrier transverse to said horizontal flow, sealed to the top interior surface of said vessel, said barrier having a lower edge below the upper surface of said oil.

8. An oil/water separator vessel as described by claim 1 and further including a means for removing fluid from the vicinity of the oil/water interface inside of said vessel, comprising a conduit positioned at the oil/water interface protruding horizontally, from the interior of said vessel, transverse to said horizontal flow, to the exterior of said vessel, sealed at the intersection of the said vessel wall to prevent leakage of the said vessel contents and further comprising a valve exterior of said vessel for controlling the rate of flow exiting said vessel from said vicinity of the oil/water interface.

* * * * *